(12) United States Patent
Mahajan et al.

(10) Patent No.: US 11,063,504 B2
(45) Date of Patent: Jul. 13, 2021

(54) MULTI-DEGREE-OF-FREEDOM ELECTROMAGNETIC MACHINE INCLUDING PLANAR COILS

(71) Applicant: HONEYWELL INTERNATIONAL INC., Morris Plains, NJ (US)

(72) Inventors: Deepak Pitambar Mahajan, Bangalore (IN); Renukaprasad N, Bangalore (IN); Ramakrishna Rao P. V, Bangalore (IN); Subhashree Rajagopal, Bangalore (IN); Govind Yadav, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 170 days.

(21) Appl. No.: 16/511,419

(22) Filed: Jul. 15, 2019

(65) Prior Publication Data

US 2021/0021187 A1    Jan. 21, 2021

(51) Int. Cl.
*H02K 41/06* (2006.01)
*H01F 27/28* (2006.01)

(52) U.S. Cl.
CPC ....... *H02K 41/065* (2013.01); *H01F 27/2804* (2013.01); *H02K 2201/18* (2013.01)

(58) Field of Classification Search
CPC ...... H02K 41/00; H02K 41/03; H02K 41/031; H02K 41/06; H02K 41/065; H02K 7/00; H02K 7/06; H02K 7/11; H02K 7/116; H02K 21/22; H02K 1/02; H02K 1/12; H02K 1/27; H01F 27/00; H01F 27/28; H01F 27/2804
See application file for complete search history.

(56) References Cited

U.S. PATENT DOCUMENTS

| | | | | |
|---|---|---|---|---|
| 6,664,666 B2 * | 12/2003 | Corcoran | ............... | G05G 9/047 310/12.23 |
| 6,803,736 B1 | 10/2004 | Erten | | |
| 6,879,076 B2 * | 4/2005 | Long | ........................ | H02K 1/02 310/156.38 |
| 6,975,054 B2 * | 12/2005 | Shkondin | ............... | H02K 25/00 310/127 |
| 9,325,212 B2 | 4/2016 | Tangudi | | |
| 2017/0012492 A1 * | 1/2017 | Bandera | ............... | H02K 41/031 |

FOREIGN PATENT DOCUMENTS

EP    3249794 A2    11/2017

* cited by examiner

*Primary Examiner* — Tran N Nguyen
(74) *Attorney, Agent, or Firm* — Lorenz & Kopf, LLP

(57) ABSTRACT

A multi-degree of freedom electromagnetic machine includes a spherical body, an outer structure, a plurality of magnets, and a plurality of windings. Each of the plurality of windings includes a flexible dielectric substrate and an electrical conductor. The flexible dielectric substrate has an inner surface and an outer surface, and the inner surface of the flexible substrate facies the outer surface of the spherical body. The electrical conductor is disposed on at least one of the inner or outer surfaces of the flexible dielectric substrate.

20 Claims, 14 Drawing Sheets

MULTI-DEGREE-OF-FREEDOM ELECTROMAGNETIC MACHINE INCLUDING PLANAR COILS

TECHNICAL FIELD

The present invention generally relates to multi-degree-of-freedom electromagnetic machines, and more particularly relates to multi-degree-of-freedom electromagnetic machines that include planar coils.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

Various types of multi-axis machines have been developed to address the above-described problems. In many instances, however, these multi-axis machines are manufactured using relatively difficult, time consuming, non-standard, and low-repeatable processes and methods.

Hence, there is a need for multi-degree-of-freedom electromechanical machines that can be manufactured using methodologies that are relatively easier, less time consuming, standard, and exhibit high repeatability as compared to known methods. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree of freedom electromagnetic machine includes a spherical body, an outer structure, a plurality of magnets, and a plurality of windings. The spherical body has an outer surface. The outer structure is spaced apart from and surrounds at least a portion of the spherical body and has an inner surface. The magnets are coupled to the inner surface of the outer structure. The windings are coupled to the outer surface of the spherical body. A least a portion of the plurality of windings partially overlap at least one other of the plurality of windings. Each of the plurality of windings includes a flexible dielectric substrate and an electrical conductor. The flexible dielectric substrate has an inner surface and an outer surface, and the inner surface of the flexible substrate facies the outer surface of the spherical body. The electrical conductor is disposed on at least one of the inner or outer surfaces of the flexible dielectric substrate and is configured as a spiral. The spiral may be circular or non-circular.

In another embodiment, a multi-degree of freedom electromagnetic machine includes a stator, a rotor, and a plurality of winding sets. The stator has an inner surface, an outer surface, an open first end, and an open second end. The inner surface defines a passage between the open first end and the open second end. The rotor is disposed within the passage and is rotatable therein. The rotor has an outer surface. The winding sets are coupled to the inner surface of the structure and are spaced apart from the outer surface of the rotor. Each of the winding sets includes a first winding, a second winding, and a third winding. The first and second winding are disposed adjacent to, and do not overlap, each other. The third winding is wound around the first and second windings. Each of the first, second, and third windings includes a flexible dielectric substrate and an electrical conductor. The flexible dielectric substrate has an inner surface and an outer surface, and the electrical conductor is disposed on at least one of the inner or outer surfaces of the flexible dielectric substrate.

Furthermore, other desirable features and characteristics of the multi-degree-of-freedom electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
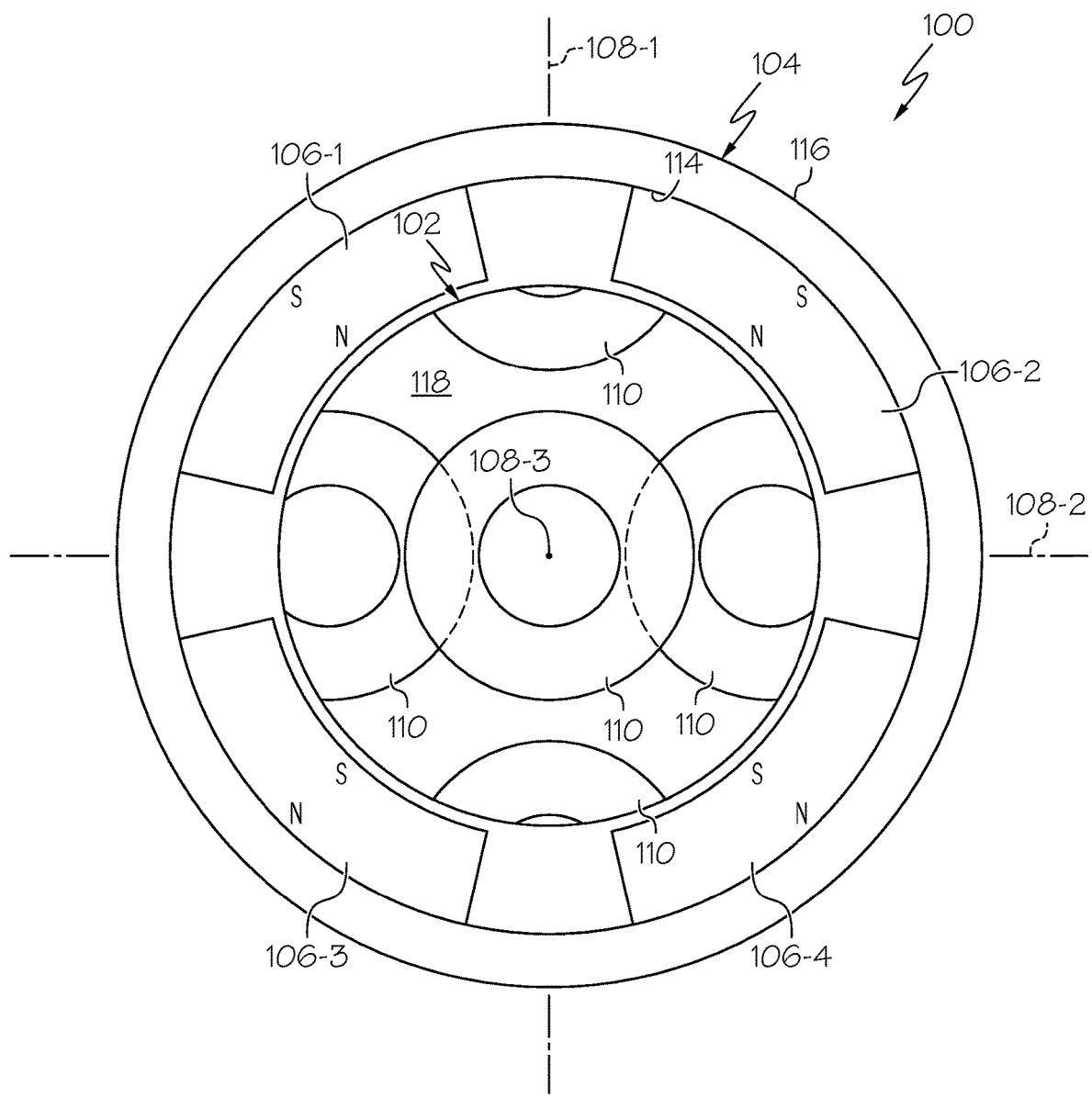
FIG. 1 depicts a simplified cross section view of a portion of one embodiment of a multi-degree-of-freedom electromagnetic machine.

With reference first to FIG. 1, a simplified cross section view of a portion of one embodiment of a multi-degree of freedom electromagnetic machine 100 is depicted, and includes an inner structure 102, an outer structure 104, and a plurality of magnets 106. The inner structure is spherically shaped and is thus also referred to herein as a spherical body 102. Because it is spherically shaped, the spherical body 102 has three perpendicularly disposed axes of symmetry 108—a first axis of symmetry 108-1, a second axis of symmetry 108-2, and a third axis of symmetry 108-3. The spherical body 102 may comprise either a magnetically permeable material or a non-magnetically permeable material and is preferably implemented as a hollow sphere. The spherical body 102 may be fixedly mounted via, for example, a non-illustrated mount structure, or it may be mounted for rotation about two or three of the axes of symmetry 108 via, for example, a non-illustrated shaft and bearing arrangement.

The outer structure 104 is spaced apart from, and surrounds at least a portion of, the spherical body 102. The outer structure 104, which includes an inner surface 114 and an outer surface 116, may be fixedly mounted or it may be mounted such that it is movable relative to the spherical body 102. When it is mounted such that it is movable relative to the spherical body 102, the outer structure 104 is preferably mounted to be moveable about two or three of the axes of symmetry 108.

The magnets 106 are coupled to, and extend inwardly from, the inner surface 114 of the outer structure 104, and are spaced apart from the spherical body 102. The electromagnetic machine 100 preferably includes a plurality of magnets 106. In the depicted embodiment, the electromagnetic machine includes four magnets—a first magnet 106-1, a second magnet 106-2, a third magnet 106-3, and a fourth magnet 106-4. It will be appreciated, however, that in other embodiments more or less than four magnets 106 may be used. It will additionally be appreciated that the magnets 106 may be variously shaped and dimensioned, and may be variously disposed. For example, in the depicted embodiment the magnets 106 are generally arc-shaped, but in other embodiments the magnets 106 may be semi-spherically shaped, wedge-shaped, or any one of numerous other shapes if needed or desired. It will additionally be appreciated that the arc length of the magnets 106 may be varied, and that the magnets 106 may be permanent magnets or, if needed or desired, electromagnets.

Regardless of the shape and dimensions, however, the magnets 106 are preferably arranged such that the polarity of the first and second magnets 106-1, 106-2 relative to the spherical body 102 is opposite to the polarity of the third and fourth magnets 106-3, 106-4. For example, in the embodiment depicted in FIG. 1, the north poles (N) of the first and second magnets 106-1, 106-2 are disposed closer to the spherical body 102, whereas the south poles (S) of the third and fourth magnets 106-3, 106-4 are disposed closer to the spherical body 102.

As FIG. 1 also depicts, a plurality of windings 110 are coupled to the outer surface 118 of the spherical body 102. It will be appreciated that the number of windings 110 coupled to the outer surface 118 of the spherical body 102 may vary. It will additionally be appreciated that positioning of the windings 110 on the outer surface 118 of the spherical body 102 may also vary. In each case, however, and as will be described further below, one or more of the plurality of windings 110 partially overlaps at least one other of the plurality of windings 110.

Unlike other multi-degree-of-freedom electromagnetic machines that include a spherical body, the windings 110 disclosed herein are not wound onto the spherical body 102. Rather, as is shown more clearly in FIG. 2, each of the plurality of windings 110 includes a flexible dielectric substrate 202 and an electrical conductor 204. The flexible dielectric substrate 202 includes an inner surface 206 and an outer surface 208. When the winding 110 is coupled to the spherical body 102, the inner surface 206 of the flexible substrate 202 faces the outer surface 118 of the spherical body 102. It will be appreciated that the flexible dielectric substrate 202 may be formed of any one of numerous materials including, for example, one or more of polyimide, nylon, polytetrafluoroethylene (PTFE), mica, woven glass, epoxy, and polyetheretherketone (PEEK), just to name a few.

Figure 2:
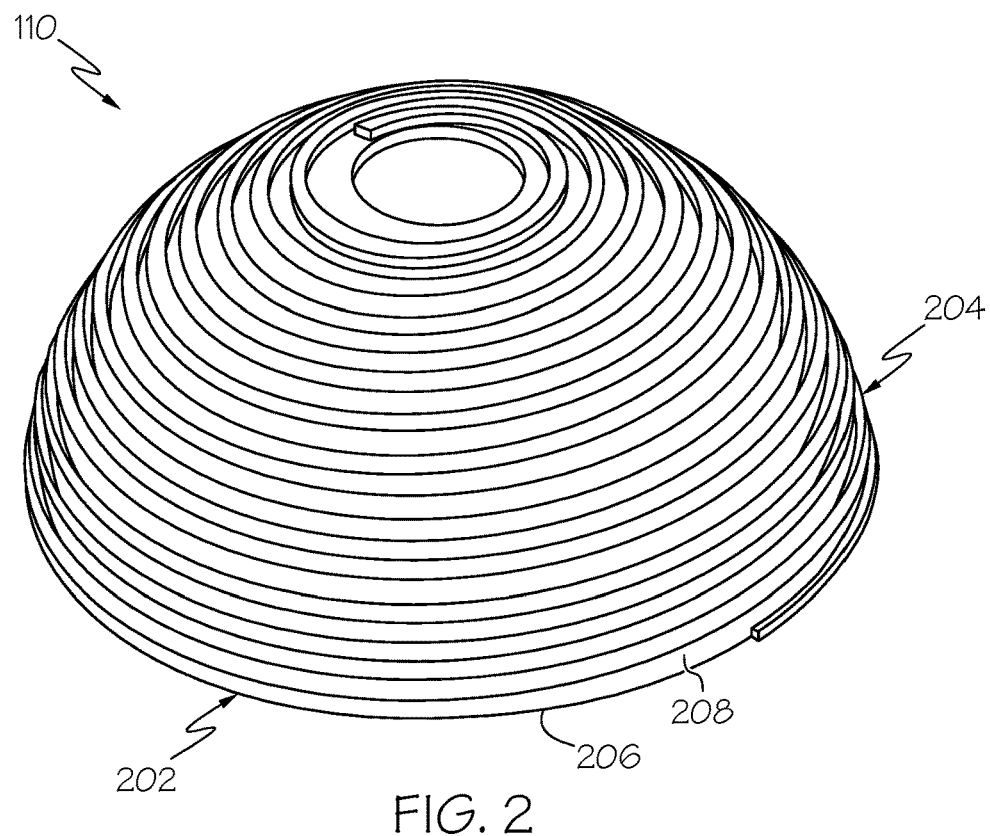
FIGS. 2-4 depict different embodiments of winding configurations that may be used in the machine of FIG. 1.

The electrical conductor 204, at least in the embodiment depicted in FIG. 2, is disposed on the outer surface 208 of the flexible dielectric substrate 202. It will be appreciated that in other embodiments the electrical conductor 204 may instead be disposed on the inner surface 206 of the flexible substrate 202. It will additionally be appreciated that the electrical conductor 204 may be disposed onto the flexible dielectric substrate 202 using any one of numerous techniques. For example, in some embodiments the electrical conductor 204 is etched onto the flexible dielectric substrate 202. In other embodiments, the electrical conductor 204 is printed onto the flexible dielectric substrate 202 using a conductive paint. The electrical conductor 204 may also be formed of any one of numerous known electrically conductive materials including, without limitation, anodized aluminum. In some embodiments, the electrical conductor may also be coated with a ceramic material.

It should be noted that although the stator winding 110 depicted in FIG. 2 has a hemispherical shape, this is merely exemplary. In other embodiments, as illustrated more clearly in FIG. 3, the stator winding 110 may be substantially flat, and may take on the contour of the outer surface 118 of the spherical body 102 when it is coupled thereto. In addition to being configurable into different shapes, it will be appreciated that each of the stator windings 110 may comprise a plurality of flexible dielectric substrates 202 that each have an electrical conductor 204 thereon. For example, as depicted in FIG. 4, each stator winding 110 may comprise a stack of flexible dielectric substrates 202, with each flexible dielectric substrate 202 having an electrical conductor 202 disposed on one of its surfaces. The electrical conductors 204 on each dielectric substrate 202 may then be electrically connected in series or parallel, as needed or desired, and the electrical connection may be facilitated using conductive paint.

Figure 3:
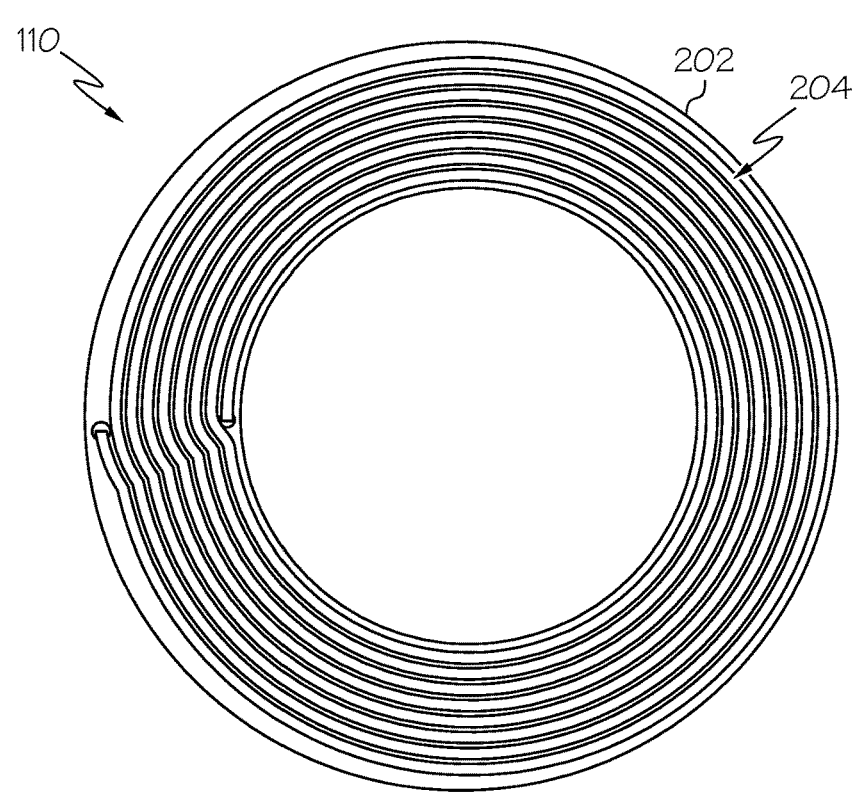
Figure 4:
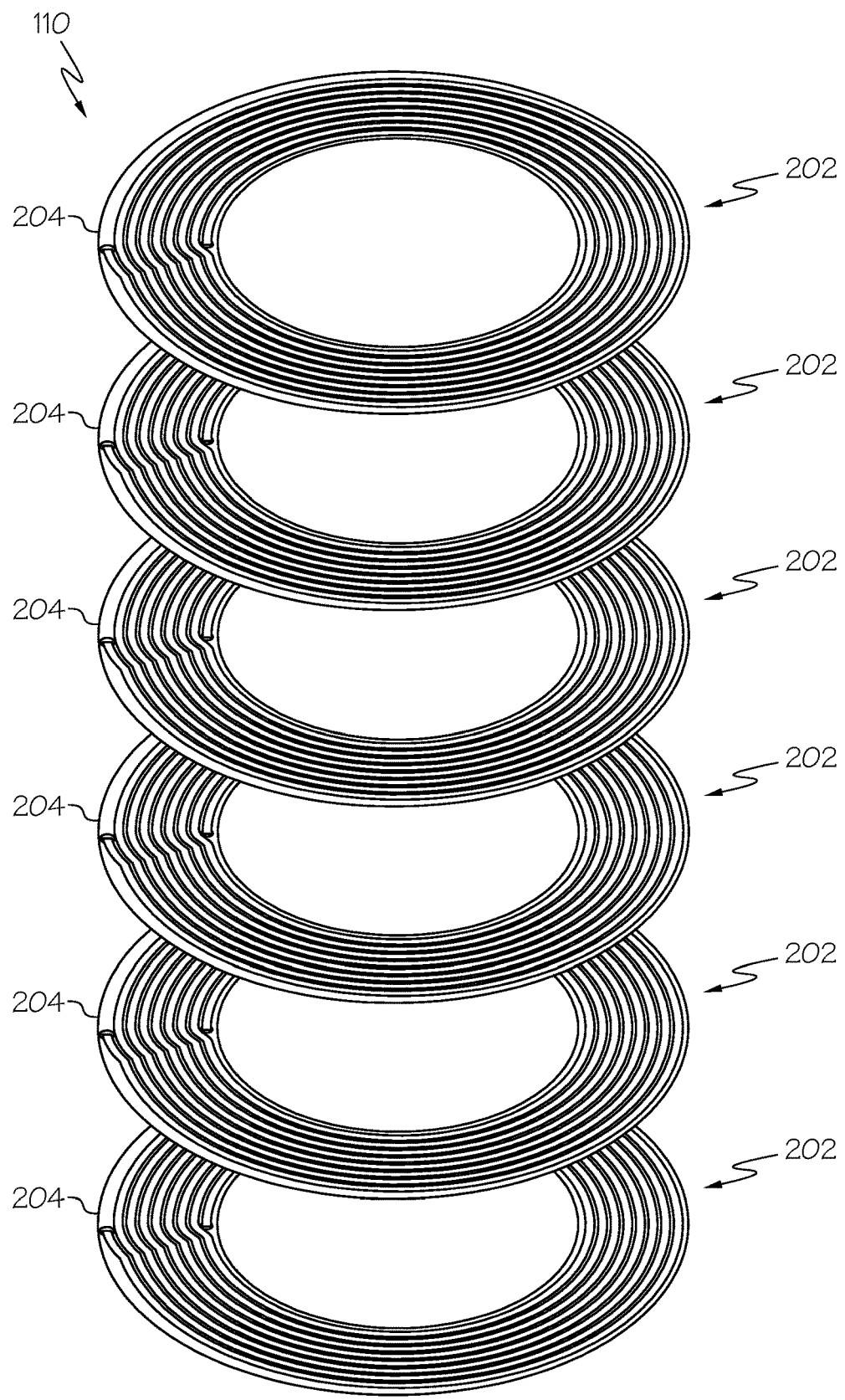
Figure 5:
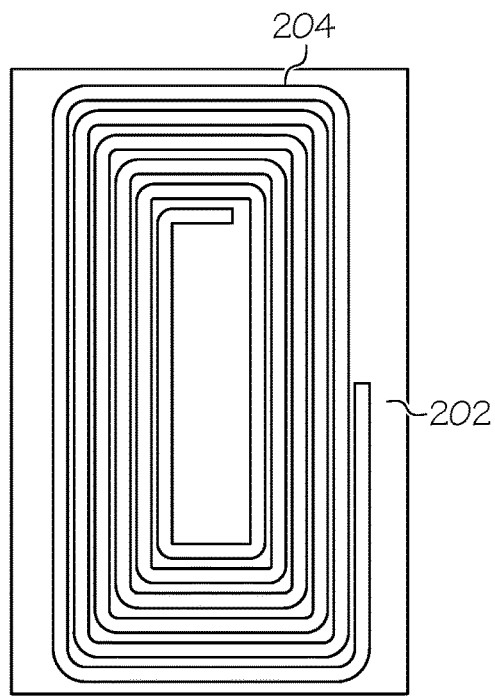
FIGS. 5 and 6 depict different configurations of how electrical conductors may be disposed on a flexible substrate.
Figure 6:
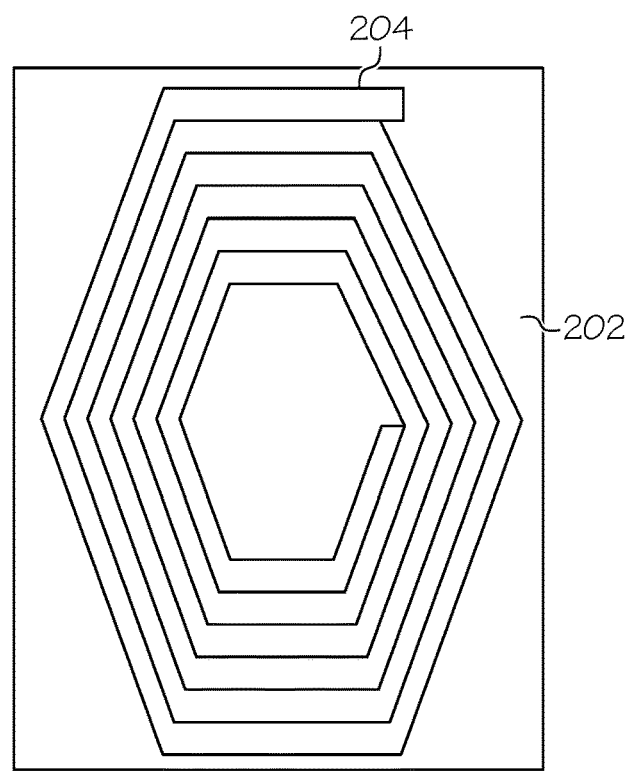

It should be further noted that although the electrical conductors 204 depicted in FIGS. 2-4 are each configured as a circular spiral, such a configuration is not required. Indeed, the conductors 204 may also be configured as a non-circular spiral. For completeness, some non-limiting examples of non-circular spirals are depicted in FIGS. 5 and 6.

It was previously mentioned that the number and positioning of the windings 110 one the outer surface 118 of the spherical body may vary. For example, in the embodiment depicted in FIG. 1, and as shown most clearly in FIGS. 7 and 8, eight windings 110 are coupled to outer surface 118 of the spherical body 102. These eight windings 110 include first and second tilt windings 110-T1, 110-T2, and first, second, third, fourth, fifth, and sixth spin windings 110-S1, 110-S2, 110-S3, 110-S4, 110-S5, 110-S6.

Before proceeding further, it is noted that the first and second tilt windings 110-T1, 110-T2 are referred to as such because controllable energization of these windings will generate a Lorentz force that affects relative movement between the spherical body 102 and the outer structure 104 about the second axis of symmetry 108-2. Moreover, the first, second, third, fourth, fifth, and sixth spin windings 110-S1, 110-S2, 110-S3, 110-S4, 110-S5, 110-S6 are referred to as such because controllable energization of these windings will generate a Lorentz force that affects relative movement between the spherical body 102 and the outer structure 104 about the first axis of symmetry 108-1.

Returning now to the description, the first and second tilt windings 110-T1, 110-T2 are diametrically opposed to each other and are disposed such that the spiral of the first and second tilt windings 110-T1, 110-T2 is symmetrically disposed about the first axis of symmetry 108-1. The first, second, third, fourth fifth, and sixth spin windings 110-S1, 110-S2, 110-S3, 110-S4, 110-S5, 110-S6 are spaced evenly around the outer surface 118 of the spherical body 102 such that the spiral of each of the first, second, third, fourth, fifth, and sixth spin windings 110-S1, 110-S2, 110-S3, 110-S4, 110-S5, 110-S6 is symmetrically disposed about a first 801-1, second 801-2, third 801-3, fourth 801-4, fifth 801-5, and sixth 801-6 normal vector, respectively, where each of the first 801-1, second 801-2, third 801-3, fourth 801-4, fifth 801-5, and sixth 801-6 normal vectors extend perpendicular to the first axis of symmetry 108-1.

Figure 7:
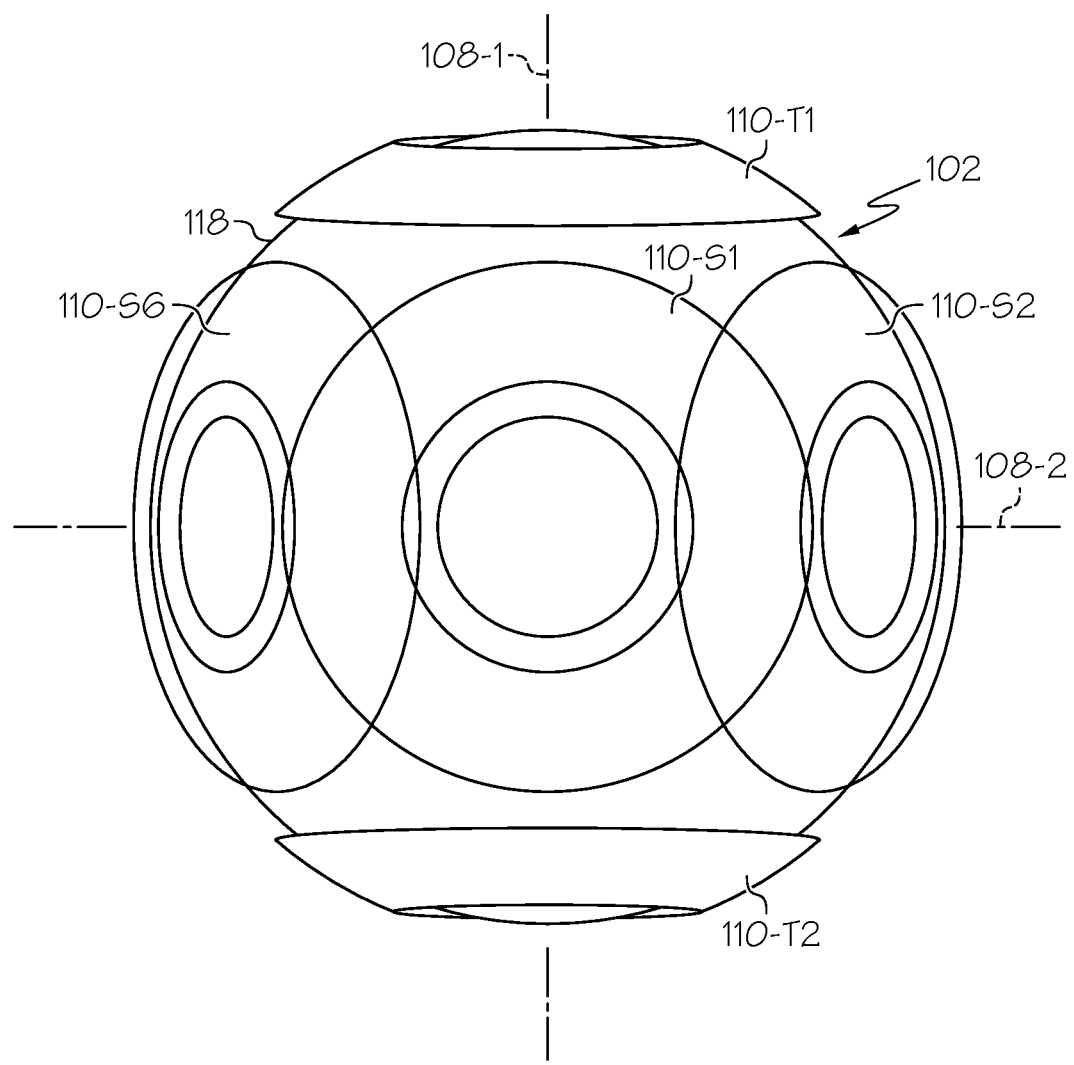
FIGS. 7 and 8 depict one embodiment of a spherical body and windings that may be used to implement the machine of FIG. 1.
Figure 8:
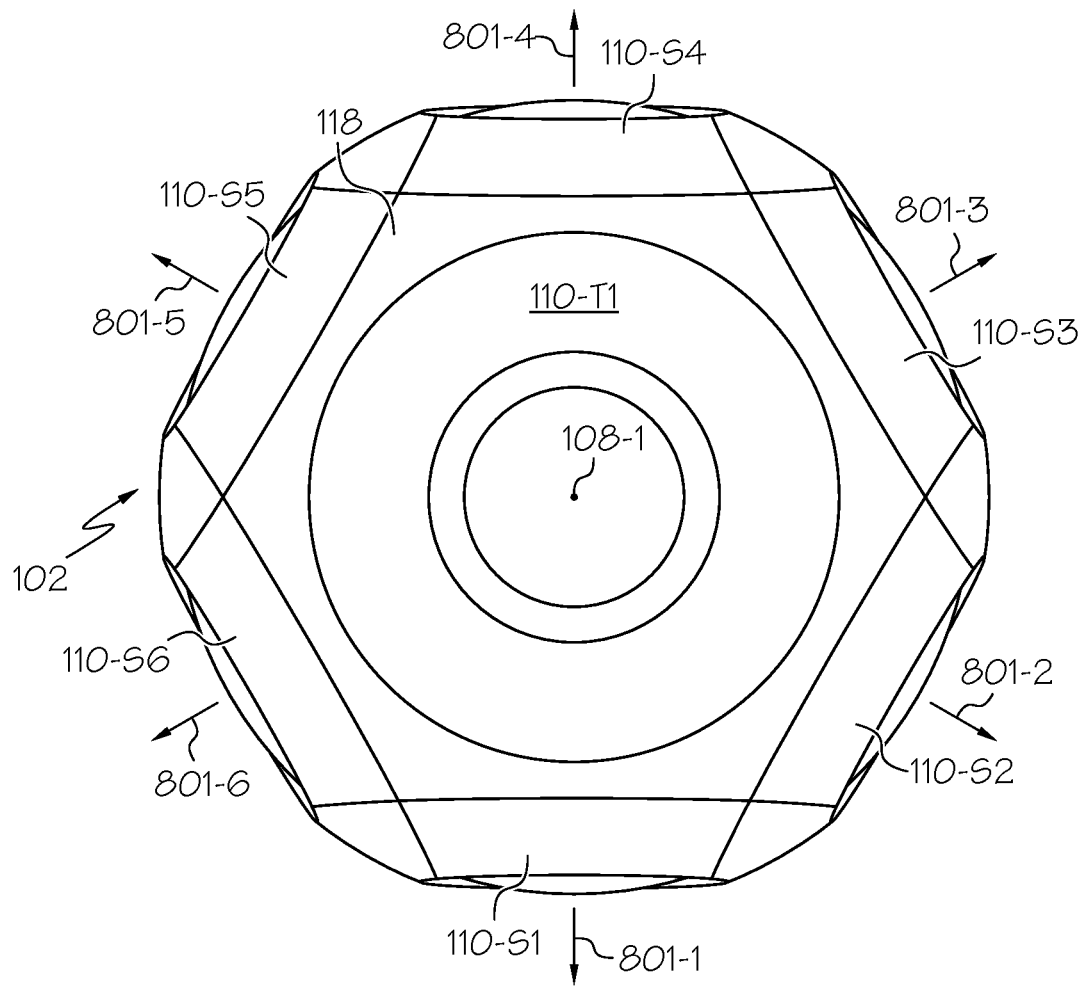

As FIGS. 1, 7, and 8 also depict, in this particular embodiment, the first and second tilt windings 110-T1, 110-T2 do not overlap with any of the first, second, third, fourth fifth, and sixth spin windings 110-S1, 110-S2, 110-S3, 110-S4, 110-S5, 110-S6. However, each of the first, second, third, fourth fifth, and sixth spin windings 110-S1, 110-S2, 110-S3, 110-S4, 110-S5, 110-S6 overlaps with two other spin windings. That is, the first spin winding 110-S1 overlaps with the second and sixth spin windings 110-S2, 110-S6, the second spin winding 110-S2 overlaps with the first and third spin windings 110-S1, 110-S3, the third spin winding 110-S3 overlaps with the second and fourth spin windings 110-S2, 110-S4, the fourth spin winding 110-S4 overlaps with the third and fifth spin windings 110-S3, 110-S5, the fifth spin winding 110-S5 overlaps with the fourth and sixth spin windings 110-S4, 110-S6, and the sixth spin winding 110-S6 overlaps with the fifth and first spin windings 110-S5, 110-S1.

Figure 9:
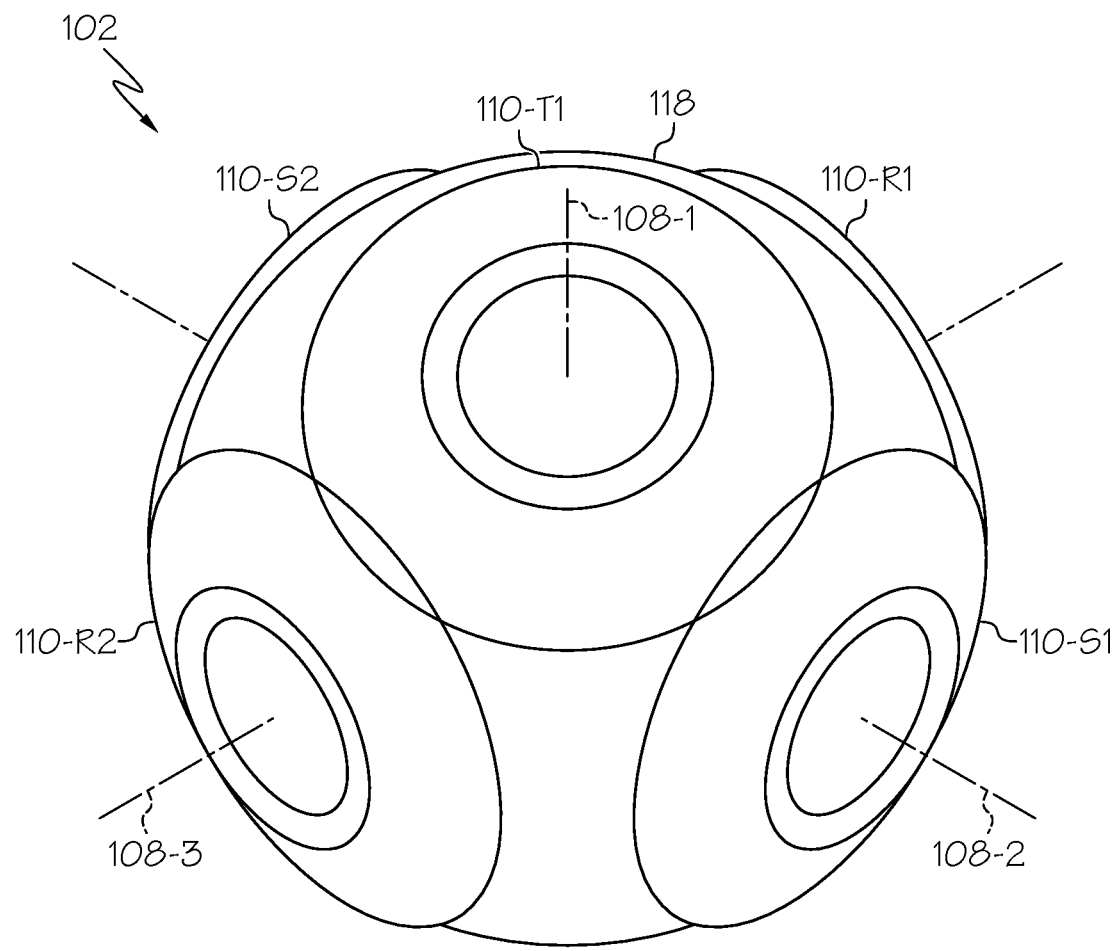
FIG. 9 depicts another embodiment of a spherical body and windings that may be used to implement the machine of FIG. 1.

In another embodiment, and with reference now to FIG. 9, the plurality of windings 110 also includes first and second tilt windings 110-T1, 110-T2. However, in this embodiment, the plurality of windings 110 includes only first and second spin windings 110-S1, 110-S2, but further includes first and second roll windings 110-R1, 110-R2. The first and second tilt windings 110-T1, 110-T2 are diametrically opposed to each other and are disposed such that the spiral of the first and second tilt windings 110-T1, 110-T2 is symmetrically disposed about the first axis of symmetry 108-1. The first and second spin windings 110-S1, 110-S2 are diametrically opposed to each other and are disposed such that the spiral of the first and second spin windings is symmetrically disposed about the second axis of symmetry 108-2. The first and second roll windings 110-R1, 110-R2 are diametrically opposed to each other and are disposed such that the spiral of the first and second spin windings is symmetrically disposed about the third axis of symmetry.

It is noted that the first and second tilt windings 110-T1, 110-T2 and the first and second spin windings 110-S1, 110-S2 are referred to as such for the same reasons as in the previous embodiment. In this embodiment, the first and second roll windings 110-R1, 110-R2 are referred to as such because controllable energization of these windings will generate a Lorentz force that affects relative movement between the spherical body 104 and the outer structure 104 about the third axis of symmetry 108-3.

As FIG. 9 further depicts, in this particular embodiment each of the first and second tilt windings 110-T1, 110-T2 overlaps with one or more of the first and second spin windings 110-S1, 110-S2 and with one or more of the first and second roll windings 110-R1, 110-R2. In some embodiments, the first and second spin windings 110-S1, 110-S2 may overlap with the first and second roll windings 110-R1, 110-R2, respectively.

Figure 10:
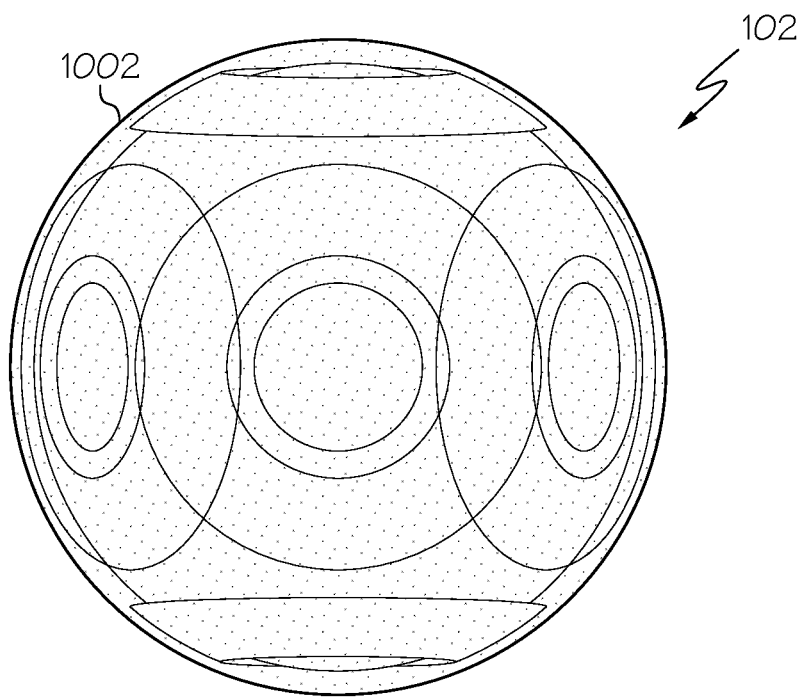
FIGS. 10 and 11 depict the spherical body and winding embodiments of FIGS. 7-9 with an encapsulation layer.
Figure 11:
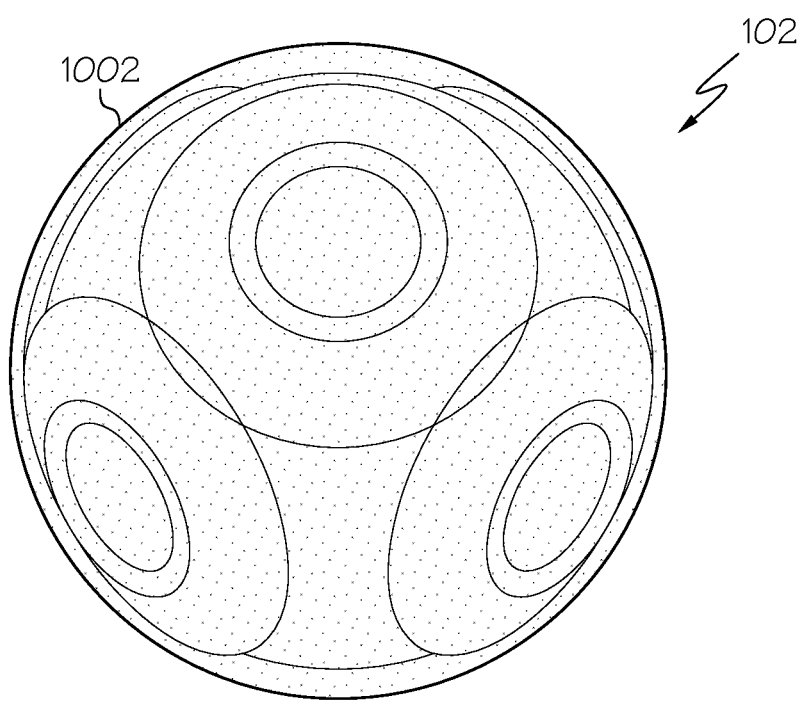

The spherical body 102 and the plurality of windings 110 may, in some embodiments, be encapsulated by a layer of dielectric material 1002. Embodiments depicting this encapsulation are depicted, for completeness, in FIGS. 10 and 11. It will be appreciated that the dielectric material used to encapsulate the spherical body 102 and the plurality of windings 110 may vary and may include, for example, epoxy, silicone, phenolic, thermoset polyesters, glass reinforced thermoplastic polyesters and ceramics, just to name a few.

Figure 12:
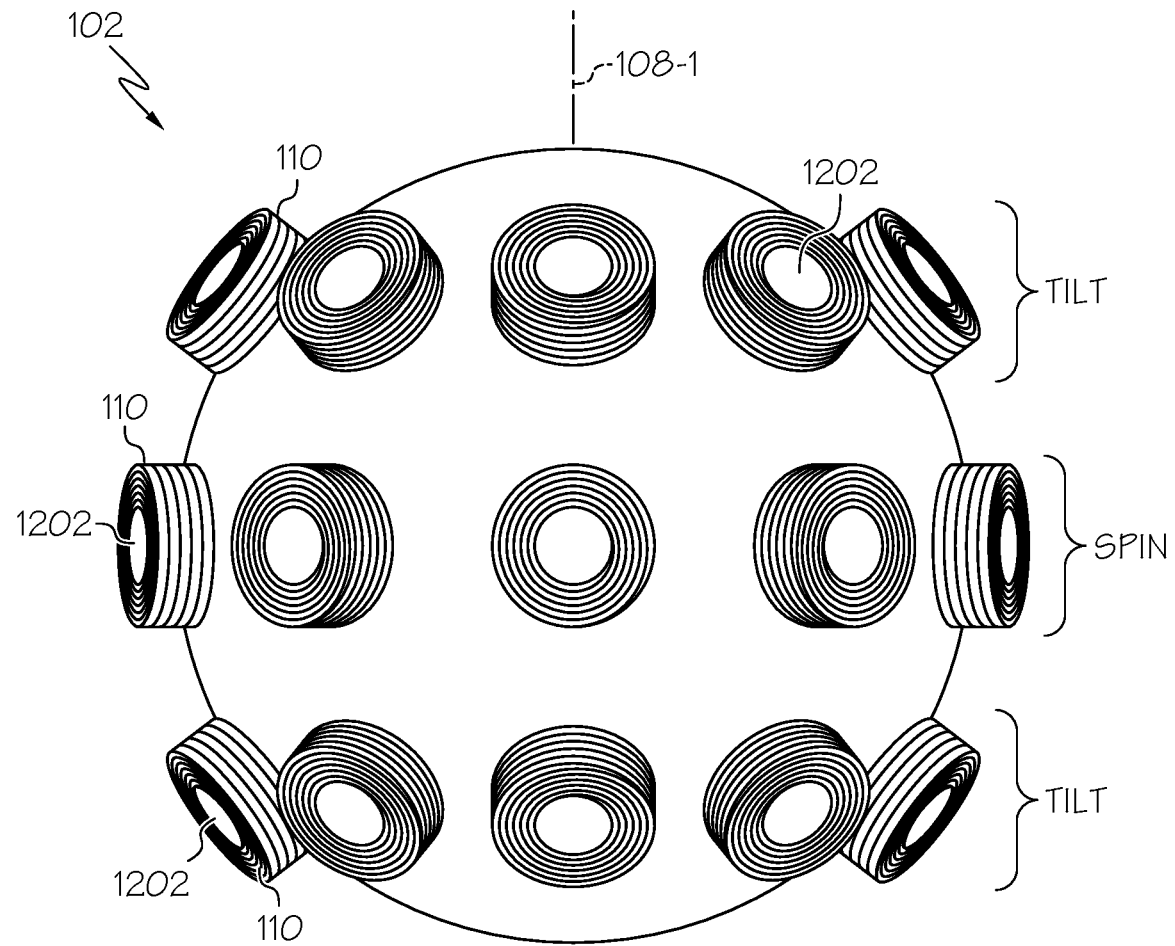
FIGS. 12 and 13 depict another embodiment of a spherical body and windings that may be used to implement the machine of FIG. 1.
Figure 13:
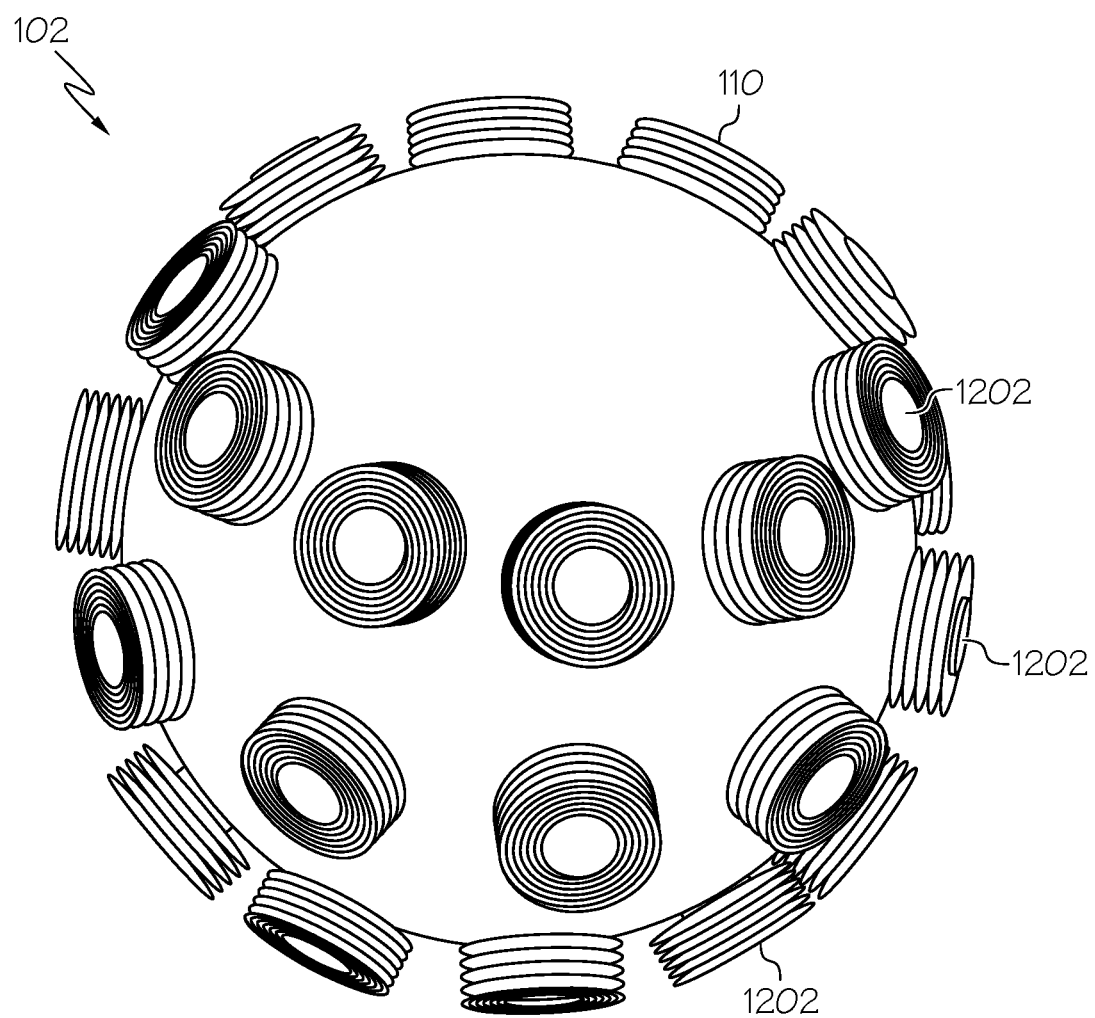

Turning now to FIGS. 12 and 13, in another embodiment the spherical body 102 may have a plurality of spaced-apart projections 1202 coupled to, and extending radially outward from, the outer surface 118. In this embodiment, each projection 1202 has a predetermined number of the plurality of windings 110 disposed therearound. More specifically, at least in the depicted embodiment, a stack of windings 110, such as was as depicted in FIG. 4 and described above, is disposed around each projection 1202. In the depicted embodiment, the projections 1202 and associated windings 110 disposed on a plane that is perpendicular to the first axis of symmetry 108-1 are spin windings, and the other projections 1202 and associated windings 110 are tilt windings.

Figure 14:
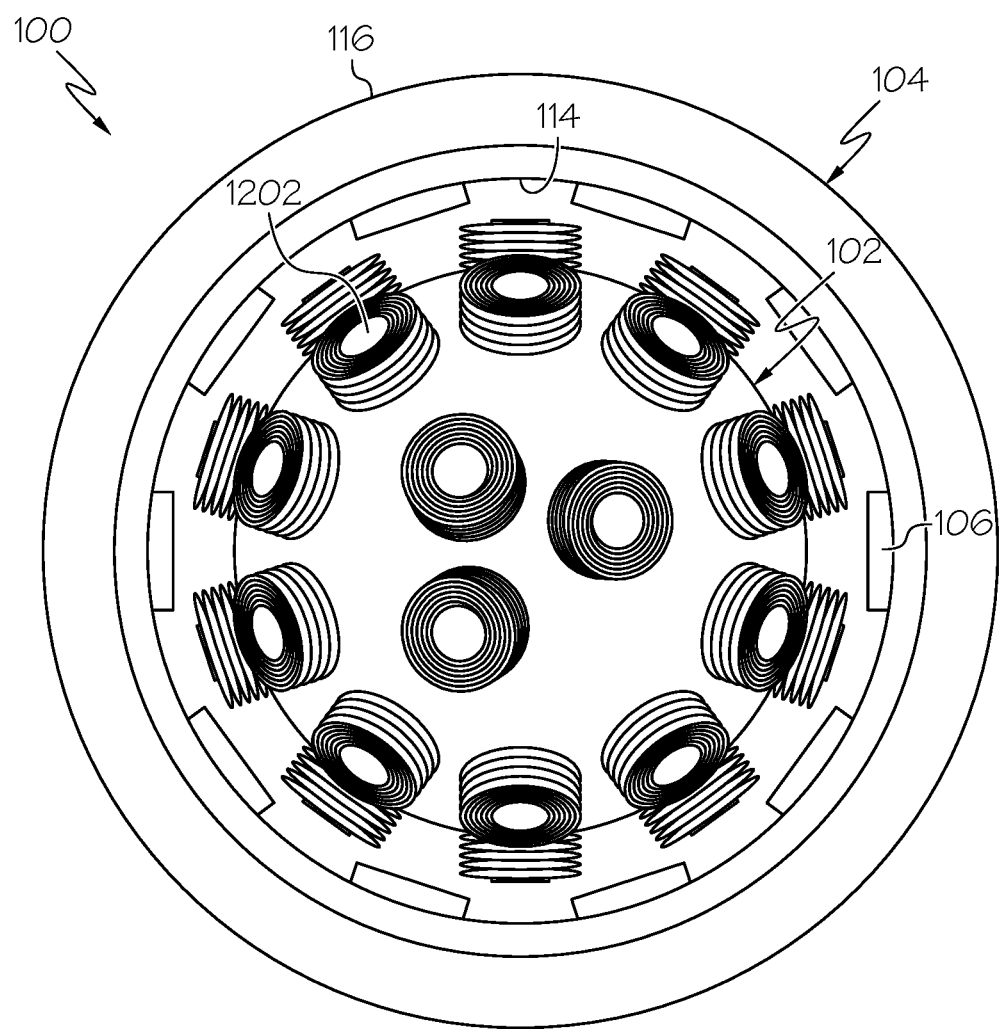
FIG. 14 depicts the spherical body of FIGS. 12 and 13 at least partially surrounded by an outer structure.
Figure 15:
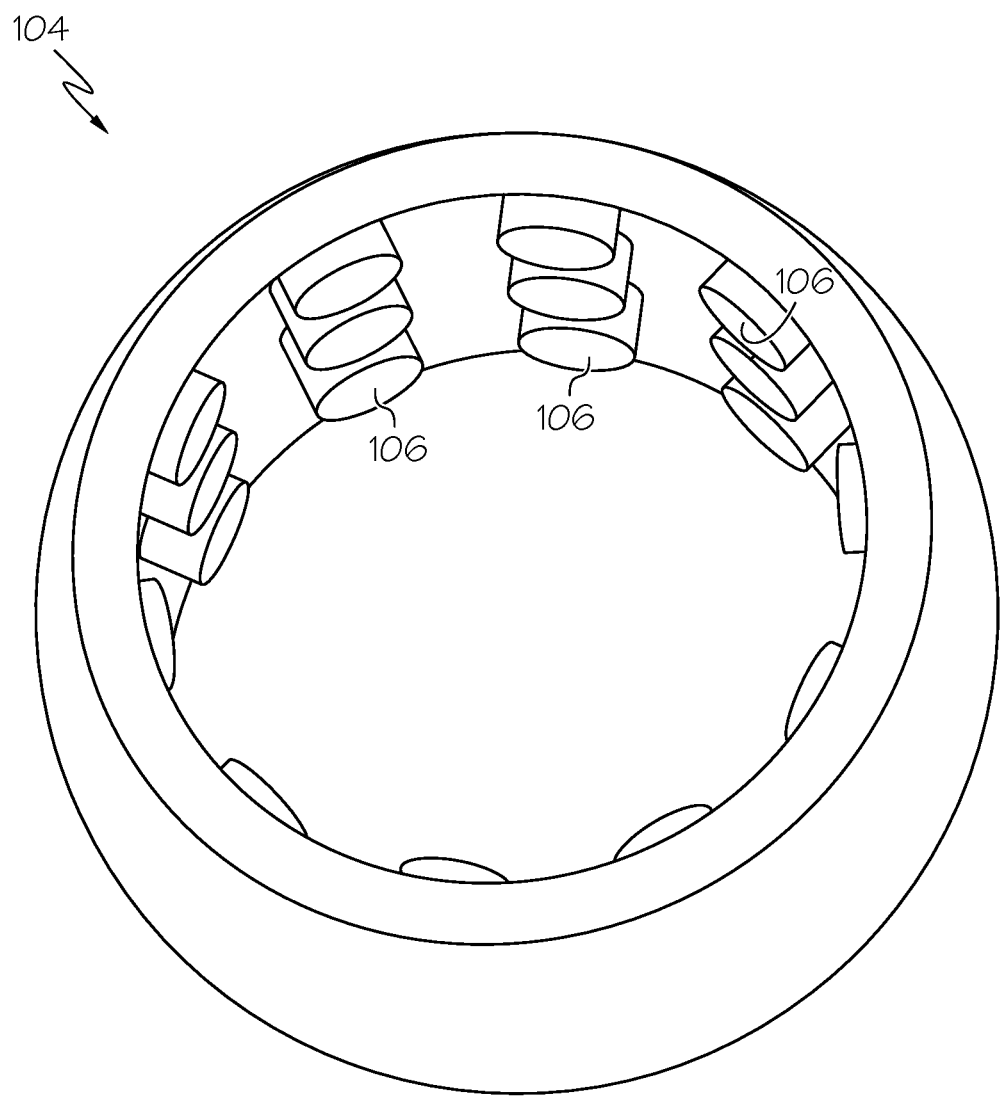
FIG. 15 depicts a top, plan view of the outer structure of FIG. 14.

Referring now to FIG. 14, the spherical body 102 depicted in FIGS. 12 and 13 is shown at least partially surrounded by an outer structure 104. The depicted outer structure 104, which may be formed of a soft magnetic material, such as low-carbon steel, has a plurality of magnets 106 coupled to its inner surface 114. The magnets 106 may extend from the inner surface 114 or may be embedded therein. The number of magnets 106 may vary, but in the depicted embodiment, and as shown more clearly in FIG. 15, there is one magnet 106 per each of the projections 1202. With this embodiment, the spherical body 102 may be implemented as either the stator or the rotor of an electromagnetic machine. That is, the spherical body 102 may be mounted against rotation (e.g., as a stator) or it may be mounted for rotation (as a rotor) relative to the outer structure 104. As may be appreciated, when the spherical body 102 is implemented as the stator, the outer structure 104 is implemented as the rotor, and vice-versa. Regardless, the spin and tilt windings may be selectively energized to achieve a desired tilt angle of the rotor (either the spherical body 102 or the outer structure 104) and a desired rotational speed of the rotor (either the spherical body 102 or the outer structure 104) at the tilt angle.

Figure 16:
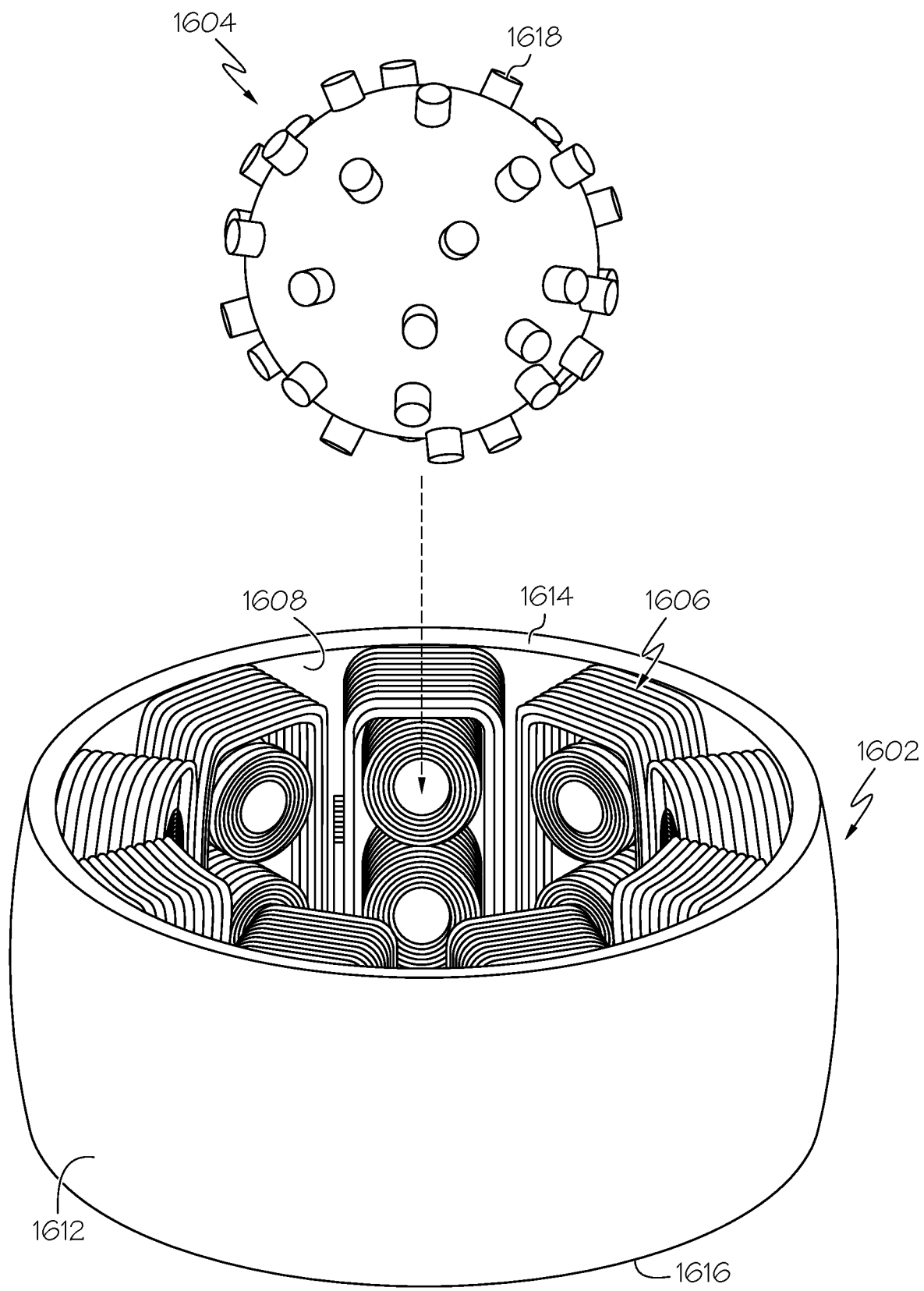
FIG. 16 depicts another embodiment of a multi-degree-of-freedom electromagnetic machine.

In one other embodiment, which is depicted in FIG. 16, a multi-degree of freedom electromagnetic machine 1600 includes a stator 1602, a rotor 1604, and a plurality of winding sets 1606. In this embodiment the stator 1602 has an inner surface 1608, an outer surface 1612, an open first end 1614, and an open second end 1616. The inner surface 1608 defines a passage between the open first end 1614 and the open second end 1616.

The rotor 1604 is disposed within the passage and is mounted for rotation. The rotor may be spherically shaped, as FIG. 16 depicts, or it may be implemented with other shapes. Regardless of its shape, it is preferably configured as a multi-pole rotor having a plurality of magnets 1618 disposed thereon.

Figure 17:
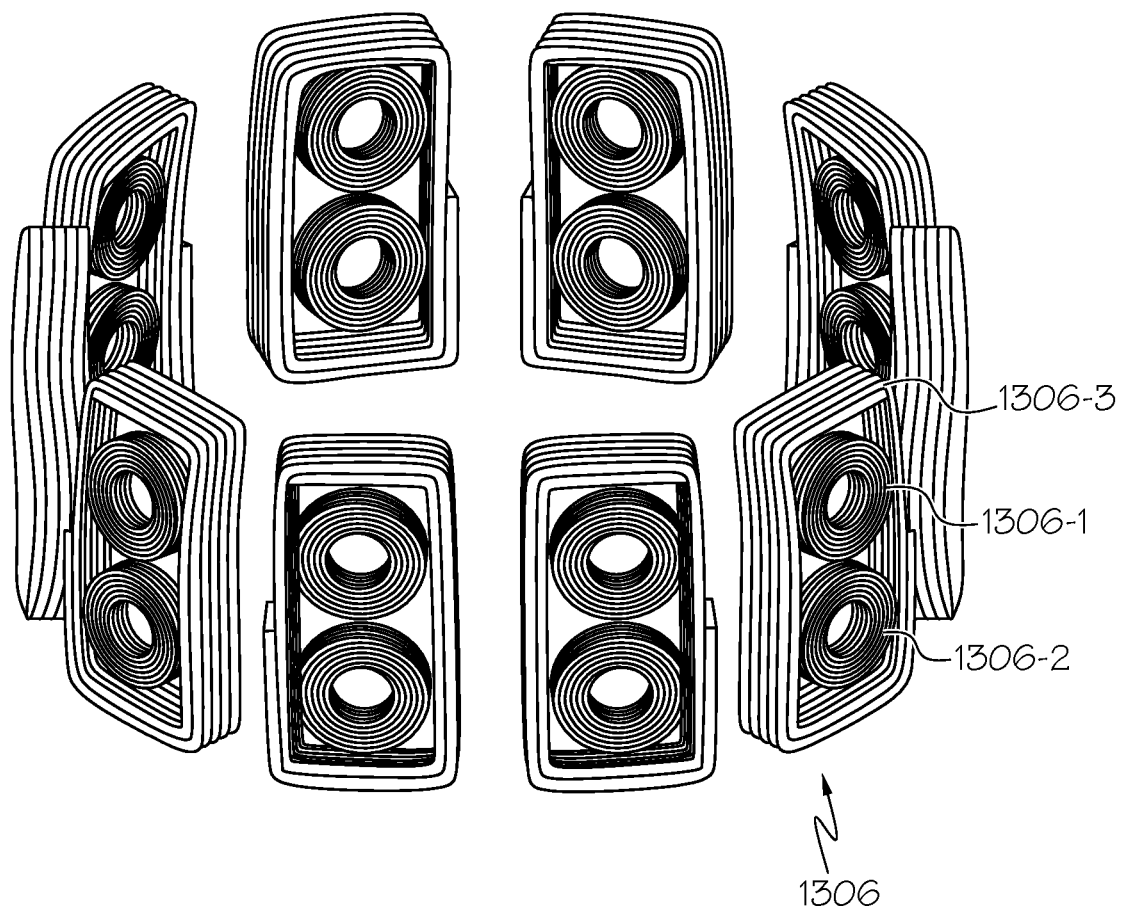
FIG. 17 depicts the configuration of the windings used to implement the machine of FIG. 16.

The winding sets 1606 are coupled to the inner surface 1614 of the stator 1602 and are spaced apart from an outer surface 1622 of the rotor 1604. As shown more clearly in FIG. 17, each of the plurality of winding sets 1606 includes a first winding 1606-1, a second winding 1606-2, and a third winding 1606-3. The first and second windings 1606-1, 1606-2 are disposed adjacent to each other, without overlapping, and the third winding 1606-3 is wound around the first and second windings 1606-1, 1606-2. In the depicted embodiment, he first and second windings 1606-1, 1606-2 are wound in a circular spiral configuration, and the third winding 1606-3 is wound in a non-circular (e.g., rectangular) spiral configuration. It will be appreciated that these configurations are merely examples and that other configurations may be used.

Regardless of the particular configurational shape of each winding 1606, each of the first, second, and third windings 1606-1, 1606-2, 1606-3 a flexible dielectric substrate and an electrical conductor, as described above. Each of the first and second windings 1606-1, 1606-2 are spin windings because controllable energization of these windings will generate a Lorentz force that affects relative movement between the stator 1602 and the rotor 1604 about the first axis of symmetry 108-1. Each of the third windings 1606-3 is a tilt winding because controllable energization of these windings will generate a Lorentz force that affects relative movement between the stator 1602 and the rotor 1604 about the second axis of symmetry 108-2.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree of freedom electromagnetic machine, comprising:
    a spherical body having an outer surface;
    an outer structure spaced apart from and surrounding at least a portion of the spherical body, the outer structure having an inner surface;
    a plurality of magnets coupled to the inner surface of the outer structure; and
    a plurality of windings coupled to the outer surface of the spherical body, a least a portion of the plurality of windings partially overlapping at least one other of the plurality of windings, each of the plurality of windings comprising:
        a flexible dielectric substrate having an inner surface and an outer surface, the inner surface of the flexible substrate facing the outer surface of the spherical body; and
        an electrical conductor disposed on at least one of the inner or outer surfaces of the flexible dielectric substrate and configured as a spiral,
    wherein the spiral may be circular or non-circular.

2. The multi-degree of freedom electromagnetic machine of claim 1, wherein:
    the spherical body has a first axis of symmetry, a second axis of symmetry, and a third axis of symmetry, the first, second, and third axes of symmetry disposed perpendicular to each other;
    the plurality of windings includes first and second tilt windings and first, second, third, fourth fifth, and sixth spin windings;
    the first and second tilt windings are diametrically opposed to each other and are disposed such that the spiral of the first and second tilt windings is symmetrically disposed about the first axis of symmetry;
    the first, second, third, fourth fifth, and sixth spin windings are spaced evenly around the outer surface of the spherical body such that the spiral of first, second, third, fourth, fifth, and sixth spin winding is symmetrically disposed about a first, second, third, fourth, fifth, and sixth normal vector, respectively; and
    the first, second, third, fourth, fifth, and sixth normal vectors each extend perpendicular to the first axis of symmetry.

3. The multi-degree of freedom electromagnetic machine of claim 2, wherein:
    each of the first, second, third, fourth fifth, and sixth spin windings overlaps with two other spin windings; and
    the first and second tilt windings do not overlap with any of the first, second, third, fourth fifth, and sixth spin windings.

4. The multi-degree of freedom electromagnetic machine of claim 1, wherein:
    the spherical body has a first axis of symmetry, a second axis of symmetry, and a third axis of symmetry, the first, second, and third axes of symmetry disposed perpendicular to each other;

the plurality of windings includes first and second tilt windings, first and second spin windings, and first and second roll windings;

the first and second tilt windings are diametrically opposed to each other and are disposed such that the spiral of the first and second tilt windings is symmetrically disposed about the first axis of symmetry;

the first and second spin windings are diametrically opposed to each other and are disposed such that the spiral of the first and second spin windings is symmetrically disposed about the second axis of symmetry;

the first and second roll windings are diametrically opposed to each other and are disposed such that the spiral of the first and second spin windings is symmetrically disposed about the third axis of symmetry.

5. The multi-degree of freedom electromagnetic machine of claim 4, wherein each of the first and second tilt windings overlaps with one or more of the first and second spin windings and with one or more of the first and second roll windings.

6. The multi-degree of freedom electromagnetic machine of claim 1, further comprising:

a plurality of spaced-apart projections, each projection coupled to, and extending radially outward from, the outer surface of the spherical stator, wherein each projection has a predetermined number of the plurality of windings disposed therearound.

7. The multi-degree of freedom electromagnetic machine of claim 6, wherein:

each of the magnets is a permanent magnet; and there is one magnet per each of the spaced-apart projections.

8. The multi-degree of freedom electromagnetic machine of claim 7, wherein:

the spherical body may be implemented as either a stator or a rotor;

when the spherical body is implemented as the stator, the outer structure is implemented as the rotor; and when the spherical body is implemented as the rotor, the outer structure is implemented as the stator.

9. The multi-degree of freedom electromagnetic machine of claim 8, wherein:

the windings may be selectively energized to achieve a tilt angle of the rotor and a rotational speed of the rotor at the tilt angle.

10. The multi-degree of freedom electromagnetic machine of claim 1, wherein the flexible dielectric substrate comprises one or more of polyimide, nylon, polytetrafluoroethylene (PTFE), mica, woven glass, epoxy, and polyetheretherketone (PEEK).

11. The multi-degree of freedom electromagnetic machine of claim 1, wherein the electrical conductor comprises anodized aluminum.

12. The multi-degree of freedom electromagnetic machine of claim 1, wherein the electrical conductor is coated with a ceramic material.

13. The multi-degree of freedom electromagnetic machine of claim 1, wherein:

each of the plurality of stator windings comprises a stack of flexible dielectric substrates;

each flexible dielectric substrate in the stack has an electrical conductor thereon; and the electrical conductors are electrically connected in series.

14. The multi-degree of freedom electromagnetic machine of claim 13, wherein the electrical conductors are electrically connected in series using conductive paint.

15. The multi-degree of freedom electromagnetic machine of claim 1, wherein:

each of the plurality of stator windings comprises a stack of flexible dielectric substrates;

each flexible dielectric substrate in the stack has an electrical conductor thereon; and the electrical conductors are electrically connected in parallel.

16. The multi-degree of freedom electromagnetic machine of claim 15, wherein the electrical conductors are electrically connected in parallel using conductive paint.

17. The multi-degree of freedom electromagnetic machine of claim 1, wherein the electrical conductor is etched onto at least one of the inner or outer surfaces of the flexible dielectric substrate.

18. The multi-degree of freedom electromagnetic machine of claim 1, wherein the electrical conductor is printed onto at least one of the inner or outer surfaces of the flexible dielectric substrate using a conductive paint.

19. The multi-degree of freedom electromagnetic machine of claim 1, further comprising a layer of dielectric material encapsulating the spherical body and the plurality of windings.

20. A multi-degree of freedom electromagnetic machine, comprising:

a stator having an inner surface, an outer surface, an open first end, and an open second end, the inner surface defining a passage between the open first end and the open second end;

a rotor disposed within the passage and rotatable therein, the rotor having an outer surface; and a plurality of winding sets coupled to the inner surface of the structure and spaced apart from the outer surface of the rotor, each of the plurality of winding sets including a first winding, a second winding, and a third winding, the first and second winding disposed adjacent to, and not overlapping, each other, the third winding wound around the first and second windings, wherein each of the first, second, and third windings comprises:

a flexible dielectric substrate having an inner surface and an outer surface; and an electrical conductor disposed on at least one of the inner or outer surfaces of the flexible dielectric substrate.

* * * * *